(12) United States Patent
Doffin et al.

(10) Patent No.: US 7,999,518 B2
(45) Date of Patent: Aug. 16, 2011

(54) METHOD FOR MANAGING POWER SUPPLY SYSTEM WITH VARIABLE VOLTAGE, ESPECIALLY OF MOTOR VEHICLE

(75) Inventors: Hugues Doffin, Chatenay Malabry (FR); Farouk Boudjemai, Marcoussis (FR); Julien Masfaraud, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 369 days.

(21) Appl. No.: 12/303,666

(22) PCT Filed: Jun. 6, 2007

(86) PCT No.: PCT/FR2007/051385
§ 371 (c)(1),
(2), (4) Date: Dec. 5, 2008

(87) PCT Pub. No.: WO2008/000984
PCT Pub. Date: Jan. 3, 2008

(65) Prior Publication Data
US 2010/0171470 A1  Jul. 8, 2010

(30) Foreign Application Priority Data
Jun. 30, 2006 (FR) ...................................... 06 52754

(51) Int. Cl.
*H02P 7/06* (2006.01)
*H02P 11/00* (2006.01)
*H02P 9/00* (2006.01)

(52) U.S. Cl. .......................................... 322/28; 322/24

(58) Field of Classification Search ................... 322/59, 322/89, 24, 28, 44; 290/8; 307/10.1
See application file for complete search history.

(56) References Cited

U.S. PATENT DOCUMENTS

| | | | | |
|---|---|---|---|---|
| 4,694,238 A | * | 9/1987 | Norton | 322/28 |
| 4,788,486 A | * | 11/1988 | Mashino et al. | 320/123 |
| 5,418,401 A | * | 5/1995 | Kaneyuki | 307/10.1 |
| 6,373,230 B2 | * | 4/2002 | Jabaji | 322/28 |
| 6,555,992 B2 | * | 4/2003 | Asao et al. | 322/28 |
| 2001/0024107 A1 | * | 9/2001 | Jabaji | 322/46 |
| 2005/0083019 A1 | * | 4/2005 | Green | 320/137 |

(Continued)

FOREIGN PATENT DOCUMENTS
EP 0 539 982 5/1993

*Primary Examiner* — Julio Gonzalez
(74) *Attorney, Agent, or Firm* — Berenato & White, LLC

(57) ABSTRACT

A method for managing a power supply system with a variable voltage comprising the following steps: according to an instantaneous rotational speed of a rotating electrical machine, a power supply system output voltage with a variable voltage is set to an optimum output voltage between first and second service voltages in such a way as to maximize the electric power delivered by the electrical machine to an energy storage system; when the instantaneous rotational speed is slower than the nominal rotational speed, the output voltage is set to a first value which is substantially equal to the first service voltage in such a way as to maximize the yield of the transfer of energy from the electrical machine to a load; and when the instantaneous rotational speed is faster than the nominal rotational speed, the output voltage (U) is set to a second value substantially equal to the second service voltage in such a way as to maximize the yield of the transfer of energy from the electrical machine towards the load.

6 Claims, 4 Drawing Sheets

U.S. PATENT DOCUMENTS

2006/0038540 A1* 2/2006 O'Gorman et al. ............. 322/28
2008/0018112 A1* 1/2008 Kleen ......................... 290/40 B
2009/0288417 A1* 11/2009 Armiroli et al. ................ 60/656
2010/0079117 A1* 4/2010 Bekiarov ........................ 322/28
2010/0298088 A1* 11/2010 Rouis et al. ....................... 477/3

* cited by examiner

METHOD FOR MANAGING POWER SUPPLY SYSTEM WITH VARIABLE VOLTAGE, ESPECIALLY OF MOTOR VEHICLE

CROSS-REFERENCE TO RELATED APPLICATIONS AND CLAIM TO PRIORITY

This application relates to International Application No. PCT/FR2007/051385 filed Jun. 6, 2007 and French Patent Application No. 0652754 filed Jun. 30, 2006, of which the disclosures are incorporated herein by reference and to which priority is claimed.

TECHNICAL DOMAIN OF THE INVENTION

The present invention concerns a method for managing a power supply system with a variable voltage, especially of a motor vehicle.

TECHNOLOGICAL BACKGROUND TO THE INVENTION

For some years, the concept of a dual-voltage electrical power supply system has been developed in order to respond to the increase in the number and the electrical consumption of the devices fitted on board motor vehicles.

Patent application FR 2836604 describes this type of dual voltage power supply system.

One part of the system is powered by a low-voltage DC energy storage element, generally consisting of a 12V battery.

Another part of the system is powered by a high-voltage electrical energy storage element, generally consisting of an ultracapacitor charged at variable voltage, via a regulator, by an alternator driven by the thermal engine of the vehicle.

The low voltage system is used chiefly to power low electrical loads, such as dashboard or cabin lighting, the radio, door lock actuators, indicator lights, etc.

The high voltage system serves to power the on-board equipment requiring high electrical power, such as the starter of the thermal engine, the headlamps, or the air conditioning system.

Transfers of electrical energy between the two parts of the system are effected by means of a reversible DC-DC converter, and are governed depending on the resources in demand and available on either of the systems, in particular as indicated in the aforementioned patent application.

The voltage of the low voltage system being substantially constant, the items of equipment connected in parallel each have only one operating point linking voltage at the terminals and current, for a given electrical power.

In the case of a classic on-board electrical system, with set voltage, powered by an electrical energy storage element associated with an alternator regulated to this fixed voltage, the only possible way to optimise the efficiency of the system appears to be to manage the utilisation of either the alternator, or the battery, or a combination of the two as depending on the energy demand, as proposed by the patent application US 20020171392.

On the other hand, since the voltage of the high voltage system is variable, the devices connected in parallel on this system, whether they are consumers or generators of electrical energy, present several possible operating points for equal power, drawn or generated.

This supplementary degree of liberty, offered by an architecture for a variable voltage electrical power supply system, seems until now not to have been taken into consideration by the person skilled in the art in order to provide optimal management of the energy available on board a motor vehicle.

GENERAL DESCRIPTION OF THE INVENTION

Therefore, the object of the present invention is a method for managing a variable voltage power supply system, especially of a motor vehicle, said system including, connected in parallel:

at least one regulator associated with a rotating electrical machine functioning as a generator at an instantaneous rotational speed slower or faster than a predetermined nominal rotational speed, said regulator producing an output voltage comprised between a first regulating voltage and a second regulating voltage greater than the first regulating voltage;

at least one electrical energy storage element having a load voltage comprised between a first service voltage and a second service voltage greater than the first service voltage;

at least one electrical energy-consuming load;

exploiting this additional leeway and consisting alternatively, depending on the desired mode of operation of this system, in that:

according to the instantaneous rotational speed of the electrical machine, the output voltage is set to an optimum output voltage comprised between the first service voltage and the second service voltage and the storage element is charged from the optimal output voltage in such a way as to maximise the electrical power delivered by the electrical machine to the storage element;

when the instantaneous rotational speed is slower than the nominal rotational speed, the output voltage is set to a first value which is substantially equal to the first service voltage and the storage element is charged, from the output voltage, in such a way as to maximise the efficiency of the transfer of energy from the electrical machine to the load;

when the instantaneous rotational speed is faster than the nominal rotational speed, the output voltage is set to a second value which is substantially equal to the second service voltage and the storage element is charged from the output voltage, in such a way as to maximise the efficiency of the transfer of energy from the electrical machine to the load.

According to another characteristic of the invention, the method also includes the step of:

periodically charging the storage element using the electrical machine with an instantaneous electrical power equal to a first nominal power only during a fraction of a predetermined time interval, the first nominal power being selected such that the time average of this instantaneous power is equal to a second nominal power required by the load, and in such a way as to maximise the efficiency of the transfer of energy from the electrical machine to the load.

According to yet another characteristic of the method according to the invention, the optimal output voltage is comprised between approximately 20V and approximately 26V, for an instantaneous rotational speed comprised between 1800 rpm and 3000 rpm.

From just these few essential specifications, the advantages brought about by the method according to the invention in relation to the prior art will have been made obvious to the person skilled in the art.

The detailed specifications of the invention are given in the description which follows in relation to the appended drawings. It should be noted that these drawings are intended only to illustrate the text of the description and do not in any way constitute a limitation of the scope of the invention.

DESCRIPTION OF PREFERRED
EMBODIMENTS OF THE INVENTION

Figure 1:
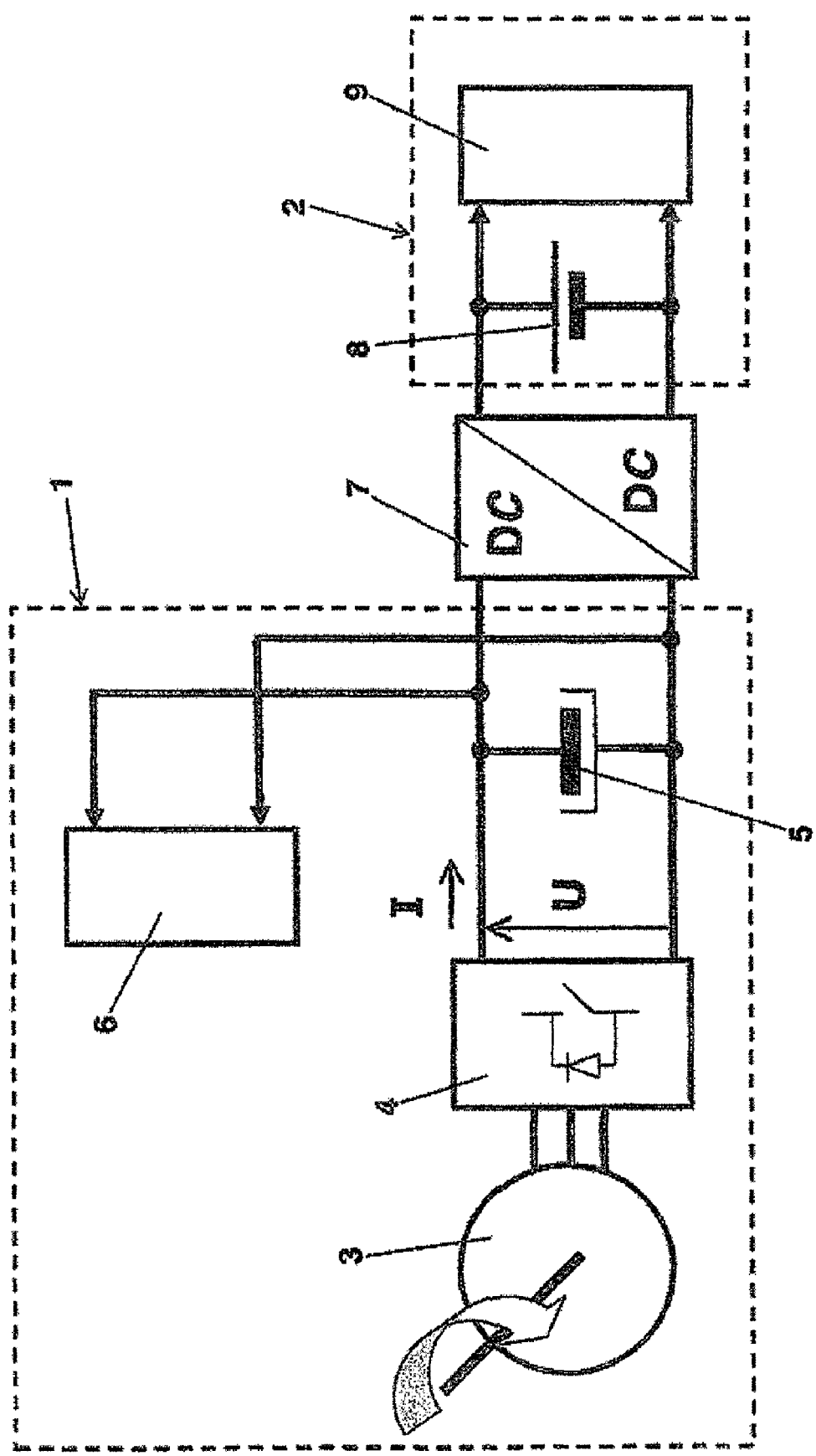
FIG. 1 shows the circuit diagram of a dual voltage electrical power supply system known in the art, in which the high voltage system is suitable for the implementation of the method according to the invention, and in particular includes a regulator associated with a rotating electrical machine operating in generator mode.

FIG. 1 shows, in diagram form, an example of a dual voltage electrical power supply system 1, 2 commonly installed on board motor vehicles.

The dual voltage system 1, 2 has a high voltage system 1 including:
- a polyphase rotating electrical machine 3, operating in generator mode;
- a regulator 4 supplying a DC output voltage from the phase currents of the electrical machine 3;
- an electrical energy storage element 5 preferably constituted by a supercapacitor, or an ultracapacitor;
- a load 6 consuming electrical energy.

This high voltage system 1 is connected by a reversible DC-DC converter 7 to a low voltage system 2 containing another electrical energy storage element 8, generally constituted by a 12V battery, and other low-power current loads 9.

As the DC-DC converter 7 is reversible, in certain modes of operation of the dual voltage system 1, 2 the battery 8 delivers energy to the high voltage system 1.

This is especially the case if the ultracapacitor 5 is to be charged when the rotating electrical machine 3 is operating in motor mode, with the electronic power module 4 connecting the machine 3 to the system, acting as a regulator 4 in alternator mode, then functioning as an inverter 4 to generate phase currents from the high DC voltage of the system 1.

A storage element such as an ultracapacitor 5 has a permissible range of charging voltages U which are generally comprised between a first service voltage of 16V and a second service voltage of 28V, for example.

FIGS. 2, 3, 4 and 5 clarify how the variability of the charging voltage U of the ultracapacitor 5, i.e. of the voltage of the high voltage system 1, allows the electrical power available and/or the efficiency to be maximised by implementing the method according to the invention.

Figure 2:
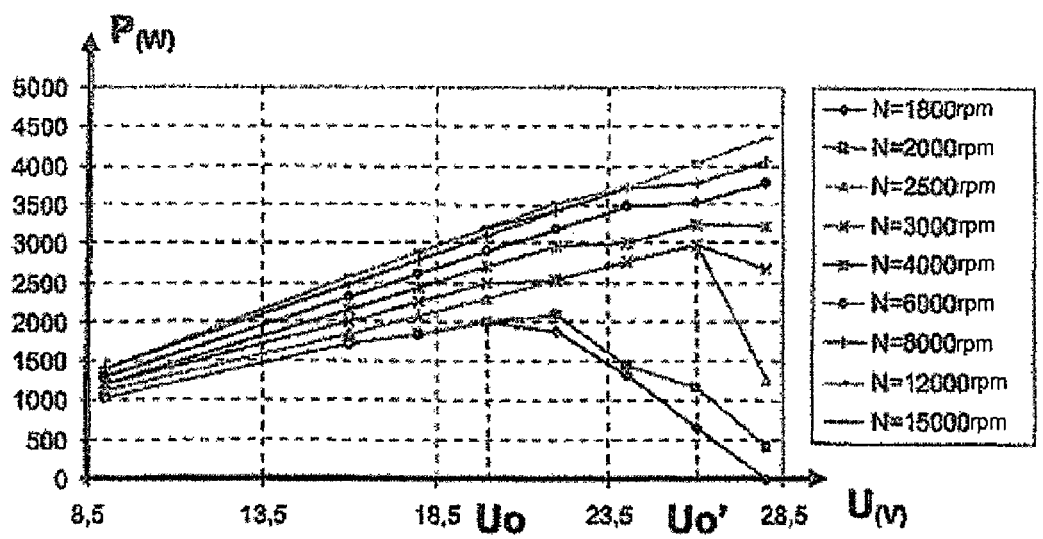
FIG. 2 shows some examples of graphs of the electrical power delivered by the rotating electrical machine operating in generator mode, shown in FIG. 1, depending on the output voltage of the regulator, for different instantaneous rotational speeds.

It will be noted in FIG. 2, giving the power delivered P depending on the output voltage of the regulator U for different values of the instantaneous rotational speed N, that for a given instantaneous rotational speed N, there is an optimal output voltage Uo, Uo' of the regulator 4 which maximises the electrical power P delivered.

For example, when the instantaneous rotational speed N is 1800 rpm, the optimal output voltage Uo of the regulator 4 is close to 20V, and the electrical power delivered P attains the maximum of 2 kW.

When the instantaneous rotational speed N is 3000 rpm, the optimal output voltage Uo' is 26V while the electrical power delivered is 3 kW.

For instantaneous rotational speeds N faster than this nominal rotational speed of 3000 rpm, the electrical power delivered increases with the output voltage U of the regulator 4, and for this reason, is limited only by the second service voltage of 28V of the ultracapacitor 5.

Figure 3:
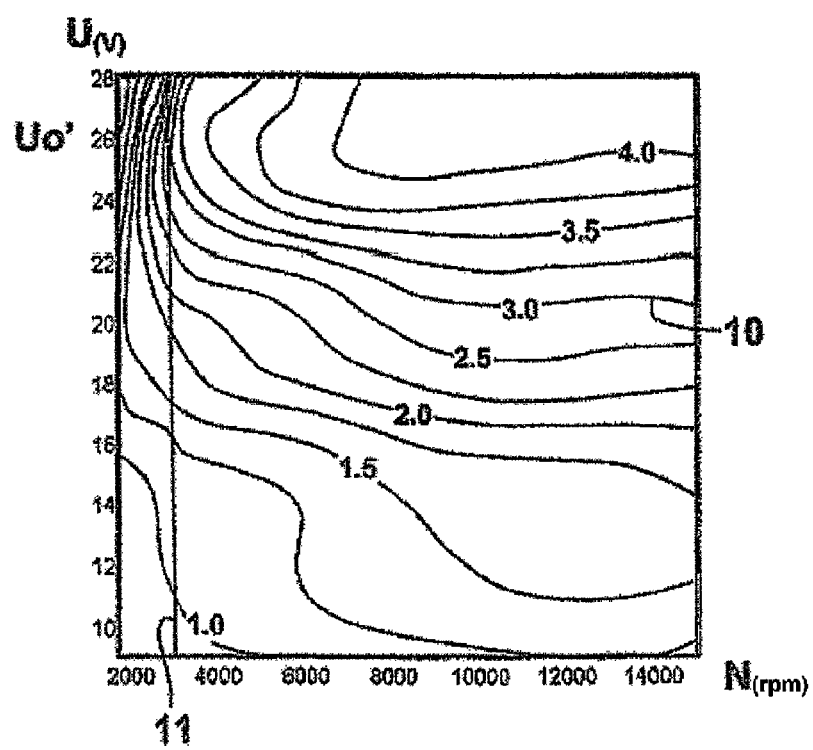
FIG. 3 shows some examples of isopower curves in the spaces of the regulating voltage/instantaneous rotational speed of the rotating electrical machine operating in generator mode shown in FIG. 1.

The same strategy of maximisation of the electrical power P delivered is also clearly seen from FIG. 3, which shows the isopower curves (in kilowatts) in the space of the output voltage U/instantaneous rotational speed N.

For example, the curve 10 corresponding to an electrical power P delivered of 3.0 kW is tangent to the abscissa 11 N=3000 at an ordinate point Uo'=26V.

Figure 4:
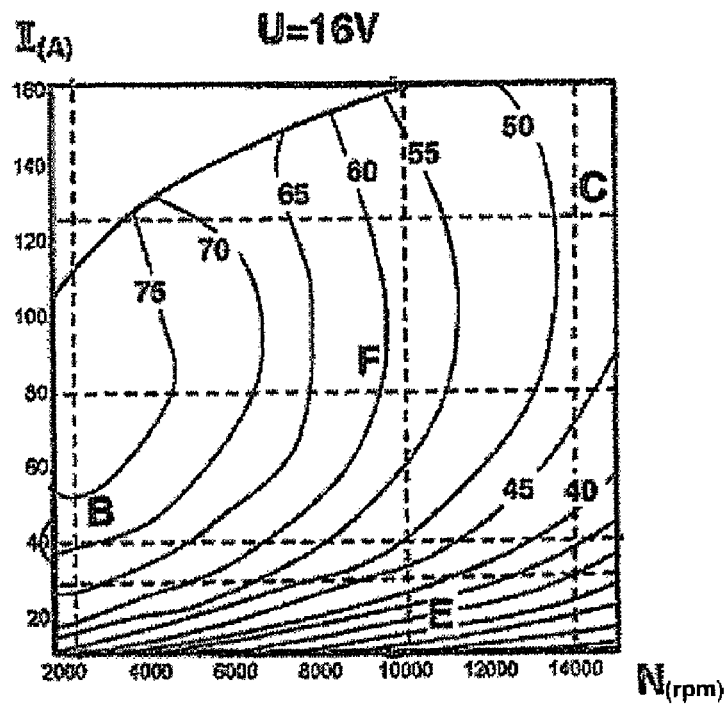
FIG. 4 shows some examples of isoefficiency curves in the space of the output current/instantaneous rotational speed of the rotating electrical machine operating in generator mode shown in FIG. 1, for a first regulating voltage.
Figure 5:
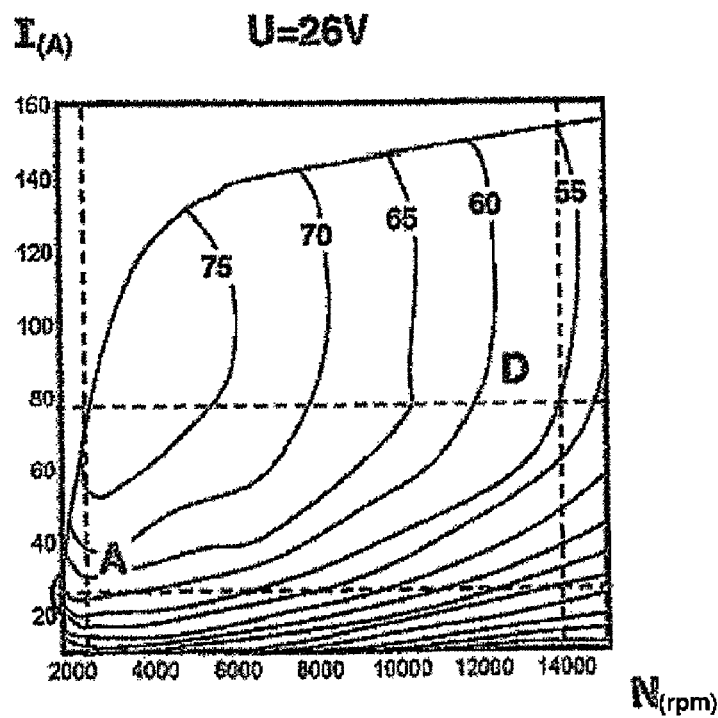
FIG. 5 shows some examples of isoefficiency curves in the space of the output current/instantaneous rotational speed of the rotating electrical machine operating in generator mode shown in FIG. 1, for a second regulating voltage greater than the first regulating voltage.

A strategy for managing the system 1 which gives priority to efficiency can be deduced, for its part, from the isoefficiency curves in the space of the current output I/instantaneous rotational speed N shown in FIGS. 4 and 5 (efficiencies expressed as %).

FIG. 4 shows a set of isoefficiency curves when the output voltage of the regulator U is 16V.

FIG. 5 shows a set of isoefficiency curves when the output voltage of the regulator U is 26V.

EXAMPLE 1

It is assumed that the electrical demand of the vehicle is 640 W, and that the thermal engine of the vehicle drives the electrical machine 3 at the instantaneous rotational speed N of 2500 rpm.

If the output voltage U of the regulator 4 is set at 26V, the current I delivered is then 25 A. FIG. 5 shows that the efficiency is approximately 62%, at abscissa point A 2500 rpm and ordinate point 25A.

If the output voltage U of the regulator 4 is set at 16V, the current I delivered is then 40 A. FIG. 4 shows that the efficiency is approximately 70%, at abscissa point B 2500 rpm and ordinate point 40A.

EXAMPLE 2

At 14000 rpm, if the electrical demand of the vehicle is 2 kW, and the output voltage U of the regulator 4 is set at 16V, the current I is 125 A. FIG. 4 shows that the efficiency is approximately 48%, at abscissa point C 14000 rpm and ordinate point 125A.

If the output voltage U of the regulator 4 is set at 26V, the current I of 76 A is associated with an efficiency of 55% (abscissa point D 14000 rpm and ordinate point 76A in FIG. 5).

When the instantaneous rotational speed N of the generator 3 is slower than a nominal rotational speed of approximately 3000 or 4000 rpm, the above examples show that the output voltage U of the regulator 4 should be set to the lowest voltage of the range of regulation compatible with the characteristics of the storage element 5, i.e. to the first service voltage of the storage element 5, so as to maximise the efficiency of the transfer of energy from the electrical machine 3 to the load 6 of the high voltage system 1.

On the contrary, when the instantaneous rotational speed N of the generator 3 is faster than this nominal rotational speed, the strategy for optimising efficiency consists of setting the output voltage U of the regulator 4 to the highest voltage compatible with the characteristics of the storage element 5, i.e. the second service voltage.

FIGS. 4 and 5 show that efficiency increases globally with current I. For any given demand for electrical power, it is thus preferable to deliver more power by operating cyclically.

EXAMPLE 3

It is assumed that the electrical demand of the vehicle is 500 W. The instantaneous rotational speed N is 10000 rpm.

The output voltage U of the regulator 4 is set at approximately 16V. The corresponding isoefficiency curves are given in FIG. 4.

The current delivered being 30 A, efficiency is approximately 43% at abscissa point E 10000 rpm and ordinate point 30A.

If the current was 80 A, for a delivered power of 1250 W, at the same instantaneous rotational speed N, efficiency would be close to 60% (point F). According to the method of the invention, the efficiency of the electrical power supply system 1 is improved by delivering instantaneous power equal to a first nominal power P1 of 1250 W only during a fraction T1 of a time interval T1+T2, the current being zero during the rest T2 of the time interval, such that the time average of this instantaneous power P is equal to a second nominal power P2 of 500 W corresponding to the demand of the vehicle.

Figure 6:
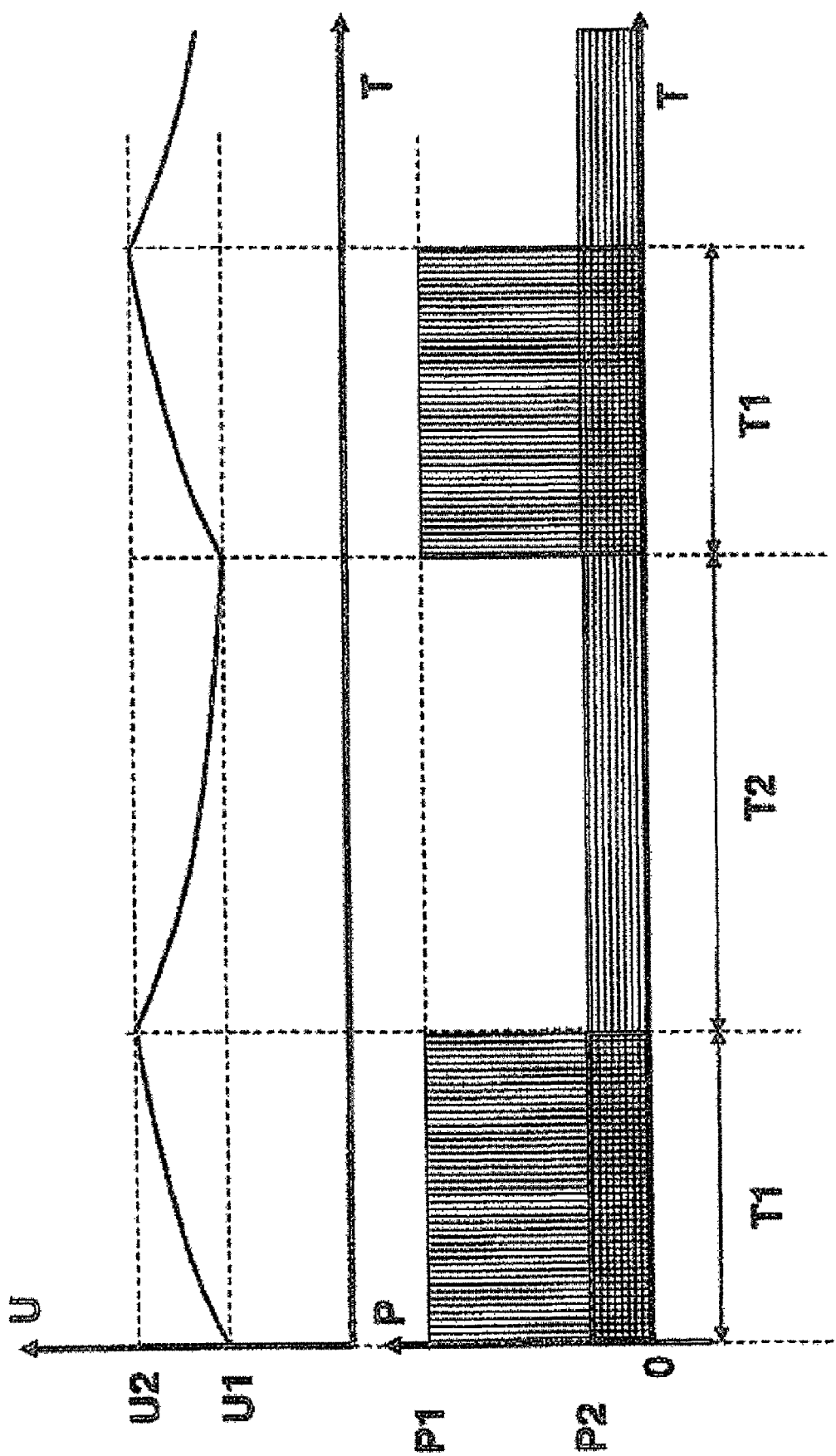
FIG. 6 illustrates a cyclic mode of operation of the variable voltage electrical power supply system shown in FIG. 1 according to the method of the invention.

FIG. 6 shows the variation of the instantaneous power P delivered in the course of time T.

Preferably, the period T1+T2 of the deliveries is in the region of 5 s. If the fraction T1 of this time interval is 2 s, the mean value of the instantaneous power is actually 1250 W×2/3=500 W.

As also shown by FIG. 6, when the energy storage element 5 is an ultracapacitor, the voltage at the terminals of this capacitor increases slightly above the initial regulation point U1 in the course of delivery.

If the period T1 of delivery I is short, the variation U2−U1 is low for a large capacity C.

In example 3 above, the capacitor is charged for T1=2 s by a current equal to the delivered current I=80 A minus the current of 30 A drawn by the load 6, thus Ic=50 A.

For a capacity C=170F, the voltage variation is U2−U1=Ic*T1/C, thus approximately 0.6V.

In example 3, the electrical machine 3 does in fact remain around the regulation point selected, and the efficiency is close to 55%, i.e. more than 10% better than the efficiency which would be achieved if the method according to the invention had not been implemented.

Naturally, the invention is not limited solely to the preferred embodiments described above. The specific values of the rotational speeds, of the voltages, of the currents, of the powers and of the efficiencies are given only by way of examples.

On the contrary, the method according to the invention encompasses all possible variants of implementation which remain within the scope defined by the following claims.

The invention claimed is:

1. A method for managing a power supply system (1) with a variable voltage (U), especially of a motor vehicle, said system (1) including, connected in parallel:
   at least one regulator (4) associated with a rotating electrical machine (3) operating in generator mode at an instantaneous rotational speed (N) slower or faster than a predetermined nominal rotational speed, said regulator (4) producing an output voltage (U) comprised between a first regulating voltage and a second regulating voltage greater than said first regulating voltage;
   at least one electrical energy storage element (5) with a load voltage being one of a first service voltage, a second service voltage greater than said first service voltage and at least one voltage greater than said first service voltage and smaller than said second service voltage;
   at least one load (6) consuming electrical energy;
   said method comprising, depending on the desired mode of functioning of said system (1), one of the steps of:
   setting, depending on said instantaneous rotational speed (N) of said machine (3), said output voltage (U) to an optimal output voltage (Uo, Uo') greater than said first service voltage and less than said second service voltage and charging said storage element (5) from said optimal output voltage (Uo, Uo'), so as to maximize the electrical power (P) delivered by said machine to said storage element (5);
   setting, when said instantaneous rotational speed (N) is slower than said nominal rotational speed, said output voltage (U) to a first value substantially equal to said first service voltage and charging said storage element (5) from said output voltage (U), so as to maximize the efficiency of the transfer of energy from said machine (3) to said load (6);
   setting, when said instantaneous rotational speed (N) is faster than said nominal rotational speed, said output voltage (U) to a second value substantially equal to said second service voltage and charging said storage element (5) from said output voltage (U), so as to maximize the efficiency of the transfer of energy from said machine (3) to said load (6).

2. The method according to claim 1, wherein the optimal output voltage (Uo) is comprised within a range between approximately 20V and approximately 26V for an instantaneous rotational speed (N) comprised between 1800 rpm and 3000 rpm.

3. The method according to claim 1, wherein the at least one electrical energy storage element (5) is one of a supercapacitor and an ultracapacitor.

4. A method for managing a power supply system (1) with a variable voltage (U), especially of a motor vehicle, said system (1) including, connected in parallel:
   at least one regulator (4) associated with a rotating electrical machine (3) operating in generator mode at an instantaneous rotational speed (N) slower or faster than a predetermined nominal rotational speed, said regulator (4) producing an output voltage (U) comprised between a first regulating voltage and a second regulating voltage greater than said first regulating voltage;
   at least one electrical energy storage element (5) with a load voltage comprised between a first service voltage and a second service voltage greater than said first service voltage;
   at least one load (6) consuming electrical energy;

said method comprising, depending on the desired mode of functioning of said system (1), one of the steps of:

setting, depending on said instantaneous rotational speed (N) of said machine (3), said output voltage (U) to an optimal output voltage (Uo, Uo') comprised between said first service voltage and said second service voltage and charging said storage element (5) from said optimal output voltage (Uo, Uo'), so as to maximize the electrical power (P) delivered by said machine to said storage element (5);

setting, when said instantaneous rotational speed (N) is slower than said nominal rotational speed, said output voltage (U) to a first value substantially equal to said first service voltage and charging said storage element (5) from said output voltage (U), so as to maximize the efficiency of the transfer of energy from said machine (3) to said load (6); and setting, when said instantaneous rotational speed (N) is faster than said nominal rotational speed, said output voltage (U) to a second value substantially equal to said second service voltage and charging said storage element (5) from said output voltage (U), so as to maximize the efficiency of the transfer of energy from said machine (3) to said load (6); and further comprising the step of:

periodically charging said storage element (5) by means of said machine (3) with an instantaneous electrical power (P) equal to a first nominal power (P1) only during a fraction (T1) of a predetermined time interval (T1+T2), said first nominal power (P1) being selected such that the time average of said instantaneous power (P) is equal to a second nominal power (P2) required by said load (6), and in such a way as to maximize the efficiency of the transfer of energy from said machine (3) to said load (6).

5. The method according to claim 4, wherein the optimal output voltage (Uo) is comprised within a range between approximately 20V and approximately 26V for an instantaneous rotational speed (N) comprised between 1800 rpm and 3000 rpm.

6. The method according to claim 4, wherein the at least one electrical energy storage element (5) is one of a supercapacitor and an ultracapacitor.

* * * * *